United States Patent [19]

Roberts, Sr.

[11] Patent Number: 5,070,437
[45] Date of Patent: Dec. 3, 1991

[54] ELECTRICAL LIGHT FOR UNDERWATER USE

[76] Inventor: Joseph M. Roberts, Sr., 1112 Otis Dr., Alameda, Calif. 94501

[21] Appl. No.: 594,068

[22] Filed: Oct. 9, 1990

[51] Int. Cl.$^5$ .............................................. F21V 25/00
[52] U.S. Cl. ...................................... 362/158; 362/189; 362/203; 362/391; 362/396
[58] Field of Search ............... 362/158, 189, 194, 203, 362/310, 391, 396, 184, 457, 407, 190, 191; 43/17.5, 17.6; 24/459, 462; 248/52, 51, 7, 316.7

[56] References Cited

U.S. PATENT DOCUMENTS

| | | | |
|---|---|---|---|
| 1,174,594 | 3/1916 | McGiff | 362/191 |
| 2,109,813 | 3/1938 | Winckler | 362/191 |
| 2,305,490 | 12/1942 | Perkins | 362/190 |
| 2,373,306 | 4/1945 | Gits | 362/203 |
| 2,386,255 | 10/1945 | Morey | 362/190 |
| 2,389,266 | 11/1945 | Marr | 362/158 |
| 2,729,740 | 1/1956 | Davis | 362/158 |
| 2,732,543 | 1/1956 | Mogren | 362/190 |
| 2,933,844 | 4/1960 | Seigle | 362/203 |
| 2,937,266 | 5/1960 | Munro | 362/191 |
| 3,418,461 | 12/1968 | Sedlock | 362/191 |
| 3,633,252 | 1/1972 | Williams | 248/51 |
| 3,940,868 | 3/1976 | Northcutt | 43/17.6 |
| 4,077,521 | 3/1978 | Alkins | 248/316.7 |
| 4,114,187 | 9/1978 | Uke | 362/158 |
| 4,242,724 | 12/1980 | Stone | 362/158 |
| 4,648,012 | 3/1987 | Pittman, II | 362/191 |
| 4,796,167 | 1/1989 | Brown et al. | 362/158 |
| 4,799,327 | 1/1989 | Treon | 43/17.6 |

FOREIGN PATENT DOCUMENTS 449736  7/1936  Norway ................ 43/17.6

Primary Examiner—Ira S. Lazarus
Assistant Examiner—Y. Quach
Attorney, Agent, or Firm—Townsend and Townsend

[57] ABSTRACT

A submersible light includes a generally cylindrical housing body having a closed end and an open end. A light emitting diode and a plurality of batteries are provided in the body, and an end cap for the open end actuates the light by flexing a lead of the light emitting diode into engagement with the batteries. A clamp ring is provided on the outside of the cylindrical housing body under which a line can slip for snap-on attachment of the light to a fishing line and the like.

13 Claims, 1 Drawing Sheet

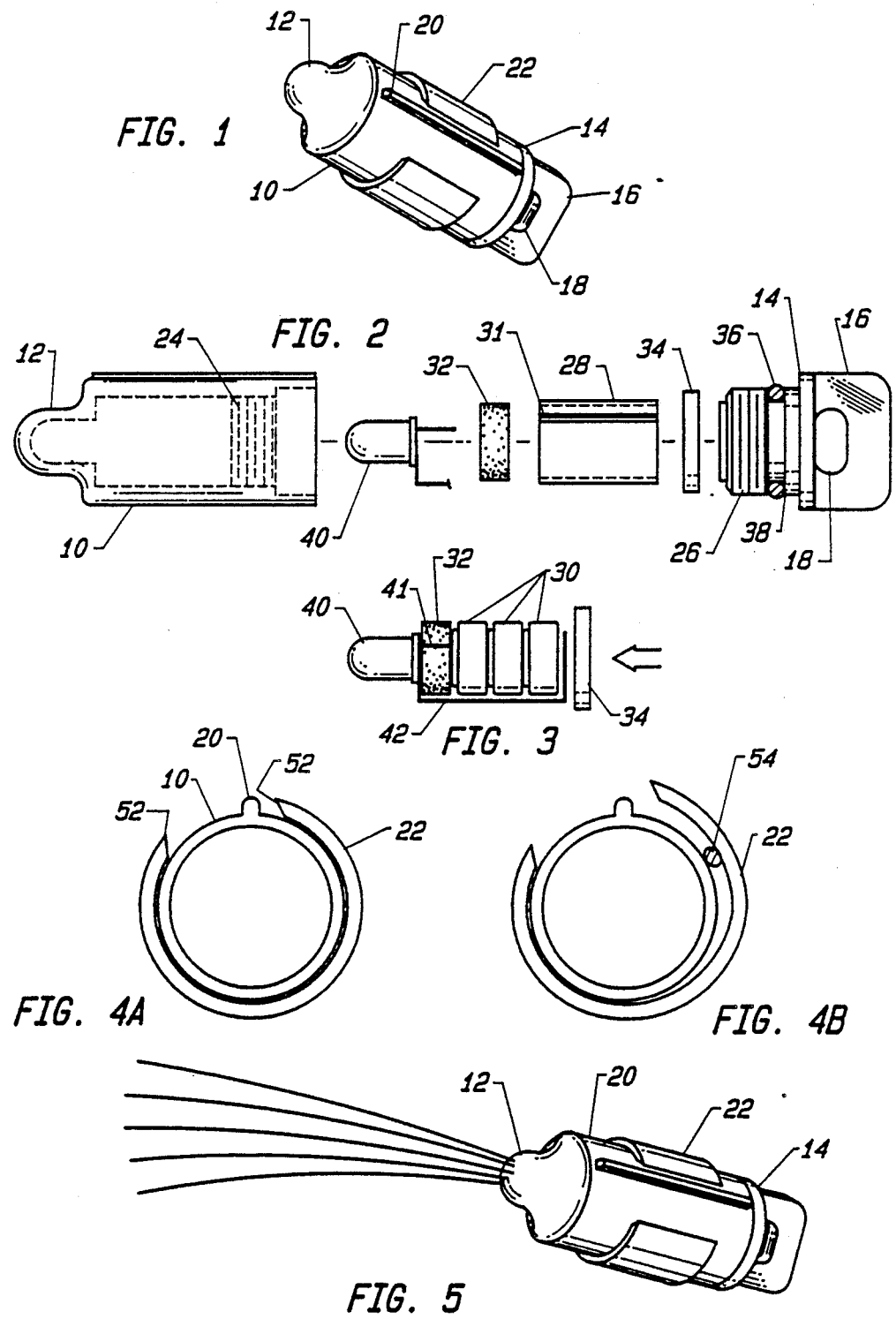

ELECTRICAL LIGHT FOR UNDERWATER USE

BACKGROUND OF THE INVENTION

This invention relates generally to electrical lights, and more particularly the invention relates to a light for underwater use and which has applicability with fishing lines and lures but its use is not so limited.

The use of light emitting diodes with fishing lures is heretofore known. See U.S. Pat. Nos. 4,663,880, 4,811,513 and 4,757,632 for example. These patents disclose integral structures including fish hooks and light devices. The light devices include light emitting diodes and batteries in a water tight container having an electrically conducting annular collar and a spring for making contact with the batteries at opposing ends. A rotatable arm projecting from the container actuates a switch contact in the container.

Other light emitting devices are available for attaching to a fishing line in close proximity to a fishing lure but separate therefrom. One such device has an electrically conducting housing for the light emitting diode and batteries with an end cap for sealing the housing. The end cap is electrically conductive and has a spring for engaging the batteries and completing an electrical circuit. The cap is provided with a head having a hole for receiving a fishing line.

The present invention is directed to an improved, inexpensive light which is especially useful with fishing lines but can be used as a safety light on a life jacket and in other applications.

SUMMARY OF THE INVENTION

An object of the present invention is an electrical light for underwater use and which is versatile in applications.

Another object of the invention is an electrical light which is economical to manufacture and rugged in use.

A feature of the invention is a unique end cap switch.

Another feature of the invention is a unique clamp for ease in attachment of the light to a fishing line.

Briefly, a light in accordance with the invention includes a water-tight housing including a body having a closed end for accommodating a suitable light source such as a light emitting diode (LED), and a removable cap at another end. The cap preferably threadibly engages the housing body and can be removed for the loading of the light source and batteries in the housing.

In accordance with a feature of the invention, the cap actuates a circuit for energizing the light source when the cap is tightened in the housing.

In a preferred embodiment a light emitting diode has two electrical leads extending therefrom with a first lead engaging one terminal of a battery power source and the second lead configured for engaging another terminal of the battery power source. The battery power source can comprise a plurality of button batteries stacked in serial arrangement within a sleeve which is positionable within the housing body. The second lead extends outside of the sleeve and includes a flexible cantilevered end portion which engages one terminal of the batteries when the cap is inserted into the body. The cap is provided with a seal such as an O-ring which engages the interior surface of the housing body to effect a water tight seal.

In a preferred embodiment, the housing body is generally cylindrical with a rib on the exterior surface running the length of the body. A flexible segmented ring is positionable about the housing body At least one end of the ring has an inclined surface which allows a fishing line to slip under the ring for locking the fishing line to the body. The rib functions as a stop to prevent rotation of the ring when the ring is grasped during attachment of the end cap. The end cap can be provided with a flange having an eyelet for tying the light to a fishing line or to any other object such as a life preserver.

The invention and objects and features thereof will be more readily apparent from the following detailed description and appended claims when taken with the drawing.

BRIEF DESCRIPTION OF THE DRAWING

FIG. 1 is a perspective view of an electrical light in accordance with one embodiment of the invention.

FIG. 2 is an exploded perspective view of the electrical light of FIG. 1.

FIG. 3 is a side view of the light and batteries illustrating the electrical circuit.

FIG. 4A and 4B are section views illustrating the clamp in accordance with one embodiment of the invention.

FIG. 5 is a perspective view of another embodiment of the electrical light in accordance with the invention.

DETAILED DESCRIPTION OF ILLUSTRATIVE EMBODIMENTS

Referring now to the drawing, FIG. 1 is a perspective view of an electrical light in accordance with one embodiment of the invention. The light includes a body portion 10 having a closed end 12 which accommodates a light such as a light emitting diode. A removable cap 14 threadibly engages the opposite end of the housing body 10 and provides a water tight seal for the light and battery power source within the body 10. The end of cap 14 includes a flange or handle 16 having a slot 18 for fastening the light to a fishing line, life preserver, or other object. The housing and cap preferably comprise an injection moldable material such as acrylic with the outside surface being highly polished. Preferably the inside surface of the body 10 other than the end 12 is provided with a textured surface.

In accordance with a feature of the invention, the housing body 10 is generally cylindrical with a rib 20 on the exterior surface running the length of the body. A segmented ring 22 is positionable about the housing body and is rotatable thereon. The ends of the ring facing the rib 20 have inclined surfaces which allow a fishing line to slip under the ring for locking a fishing line to the body, as illustrated herein below with reference to FIGS. 4A, 4B.

FIG. 2 is an exploded side view of the light of FIG. 1 with the light and battery power source removed, and FIG. 3 is a side view illustrating the light emitter and battery power source for the light. In FIG. 2, the housing 10 includes an internally threaded surface 24 which receives threads 26 on the cap 14. A sleeve 28 fits within the housing 10 and provides support for a plurality of button batteries. A groove 31 runs the length of the outer surface of the sleeve 28 and accommodates one lead of an LED as described herein below with reference to FIG. 3. A foam rubber disk 32 is provided at one end of the sleeve 28 and a hard rubber disk 34 is provided at the opposing end of the sleeve 28. An O-ring 36 (shown in section) is provided in a groove 38 of the cap and provides a watertight seal with the housing 10 when the cap threadibly engages the body 10.

FIG. 3 is a side view illustrating a light emitting diode 40 having two leads 41 and 42 extending therefrom. Lead 41 projects through the foam rubber disk 32 and engages one terminal of a stacked array of batteries 30. The other lead 42 is configured to run along the groove 31 in the sleeve 28 with the end portion of lead 42 flexibly cantilevered to engage a terminal of a battery 30. Insertion of the cap in the housing body exerts pressure on the hard rubber disk 34 which causes the end portion of lead 42 to flex and engage the battery 30 thereby completing an electrical circuit for the LED 40. When the cap is loosened or removed from the body of the light, the cantilevered end of lead 42 flexes away from the battery 30 and interrupts the electrical circuit.

FIGS. 4A, 4B are side views illustrating operation of the clamp 22 on the outer surface of the body 10. The end portions 52 of ring 22 are inclined to facilitate a fishing line slipping under the ring 22 as illustrated in FIG. 4B. Thus, the clamp ring 22 can easily fasten the light to a fishing line by slipping over the fishing line as shown at 54. Rib 20 functions as a stop to prevent rotation of ring 22 on the body 10 when the ring is grasped during attachment of the end cap to body 10.

FIG. 5 is a perspective view of another embodiment of a light in accordance with the invention in which the end portion 12 of the light has a plurality of optical fibers extending therefrom for transmitting light from the LED inside the housing to the surrounding area. This can be particularly advantageous in using the light with a fishing lure or baited hook in attracting fish to the lure or bait. In this embodiment the body and cap are preferably an opaque material so that light is transmitted solely through the optical fibers.

While the submersible light is particularly advantageous as a fish attraction light when used on a fishing line, the light can be used in many other applications as a safety light, key ring light, bike light, and the like. A red super bright direct lens can be effectively used as a safety light on a life jacket in the water.

There has been described an improved submersible light which is economical in manufacture and dependable and versatile in use. The ring clamp of the invention is particularly advantageous in attaching the light to a fishing line While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A submersible light comprising
   a housing body having a closed end and an open end,
   a light source positioned in said closed end, said light source having two electrical leads extending therefrom, at least one battery positioned in said housing body and having two electrical terminals, a first lead of said light source engaging one terminal and a second lead being configured with a cantilevered end portion to flex into engagement with the other terminal,
   resilient means positioned between said light source and said at least one battery for yieldably separating said first lead and said one terminal of said battery, and
   an end cap threadibly engaging said open end and sealing said housing body, said cap urging said one terminal into engagement with said first lead and flexing said second lead into engagement with said other terminal as said cap engages said open end of said housing body.

2. The submersible light as defined by claim 1 wherein said light source comprises a light emitting diode.

3. The submersible light as defined by claim 2 and including a plurality of batteries, and a sleeve for supporting said plurality of batteries in stacked arrangement in said housing body.

4. The submersible light as defined by claim 3 wherein said sleeve has an external surface and a groove running the length of said sleeve in said external surface, said groove receiving said second lead of said light emitting diode.

5. The submersible light as defined by claim 4 said resilient means comprising a foam rubber disk positioned between said light emitting diode and said sleeve, said one lead of said light emitting diode extending through said foam rubber disk and in engagement with a terminal of a battery, and a hard rubber disk positioned between said end cap and said sleeve, said second lead being positioned between a terminal of a battery and said hard rubber disk.

6. The submersible light as defined by claim 4 wherein said end cap includes a groove for receiving an O-ring, and an O-ring positioned in said groove and engaging said housing body for providing a seal.

7. The submersible light as defined by claim 6 wherein said end cap includes a handle and a slot in said handle.

8. The submersible light as defined by claim 1 wherein said closed end of said housing body is transparent.

9. The submersible light as defined by claim 1 wherein said housing body is opaque and further including a plurality of optical fibers extending from said closed end.

10. The submersible light as defined by claim 1 wherein said housing body is generally cylindrical and has an external surface with a raised rib running the length of said body, and further including a flexible clamp ring positioned around said housing body for attaching said light to a line.

11. A light comprising
    a generally cylindrical housing body having an external surface with a raised rib thereon, and
    a flexible clamp ring positioned around said external surface for attaching a line to said housing body, said line slipping under said flexible ring between said housing body and said ring.

12. The light as defined by claim 11 and further including inside of said housing body a light source and battery means for energizing said light source.

13. The light as defined by claim 12 wherein said housing body has a closed end and an open end, and further including an end cap which threadibly engages said open end, said raised rib functioning as a stop for said flexible clamp ring.

* * * * *